United States Patent

[11] 3,610,901

| [72] | Inventor | David D. Lynch |
| | | Glendale, Mo. |
| [21] | Appl. No. | 856,252 |
| [22] | Filed | Sept. 9, 1969 |
| [45] | Patented | Oct. 5, 1971 |
| [73] | Assignee | Emerson Electric Co. |
| | | St. Louis, Mo. |

[54] DIGITAL MODIFIED DISCRETE FOURIER TRANSFORM DOPPLER RADAR PROCESSOR
11 Claims, 13 Drawing Figs.

[52] U.S. Cl................................................ 235/152,
181/.5 F, 235/156, 340/15.5 DP, 343/5 DP,
343/17.1 R
[51] Int. Cl............................................... G06f 7/38,
G01s 9/00
[50] Field of Search............................................ 235/152,
156; 343/5 DP, 7.7, 17.1; 340/15.5 DP; 181/.5 F

[56] References Cited
UNITED STATES PATENTS
3,402,285 9/1968 Wang.......................... 235/156 X

| 3,404,399 | 10/1968 | Eschner...................... | 343/5 X |
| 3,432,754 | 3/1969 | Schwartz..................... | 325/38 |
| 3,480,953 | 11/1969 | Shreve......................... | 343/7.7 |
| 3,487,405 | 12/1969 | Molho et al.................. | 343/5 X |

Primary Examiner—Charles E. Atkinson
Attorney—Roylance, Abrams, Kruger, Berdo & Kaul ABSTRACT: A system for processing data from Doppler radar returns including a sample and hold circuit, an A/D converter and scratchpad memory which holds the binary data for insertion, on a return-by-return basis, into a main MOS memory. The data is orthogonally extracted from the main memory on a range-by-range basis, each range group or cell being delivered to a digital filter. The binary data is converted to binary logarithm form for addition to a log coefficient weighting function to perform a multiplication in the filter. The filter is a modified discrete Fourier transform filter which acts as a bandpass and eliminates images and clutter. The filtered data is again stored and then converted to analog form for video displays.

Fig. 2.

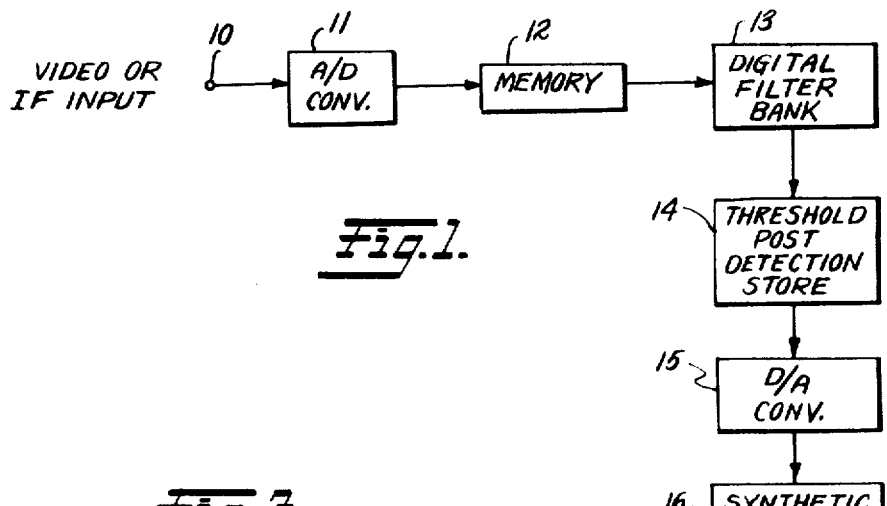
Fig. 1.
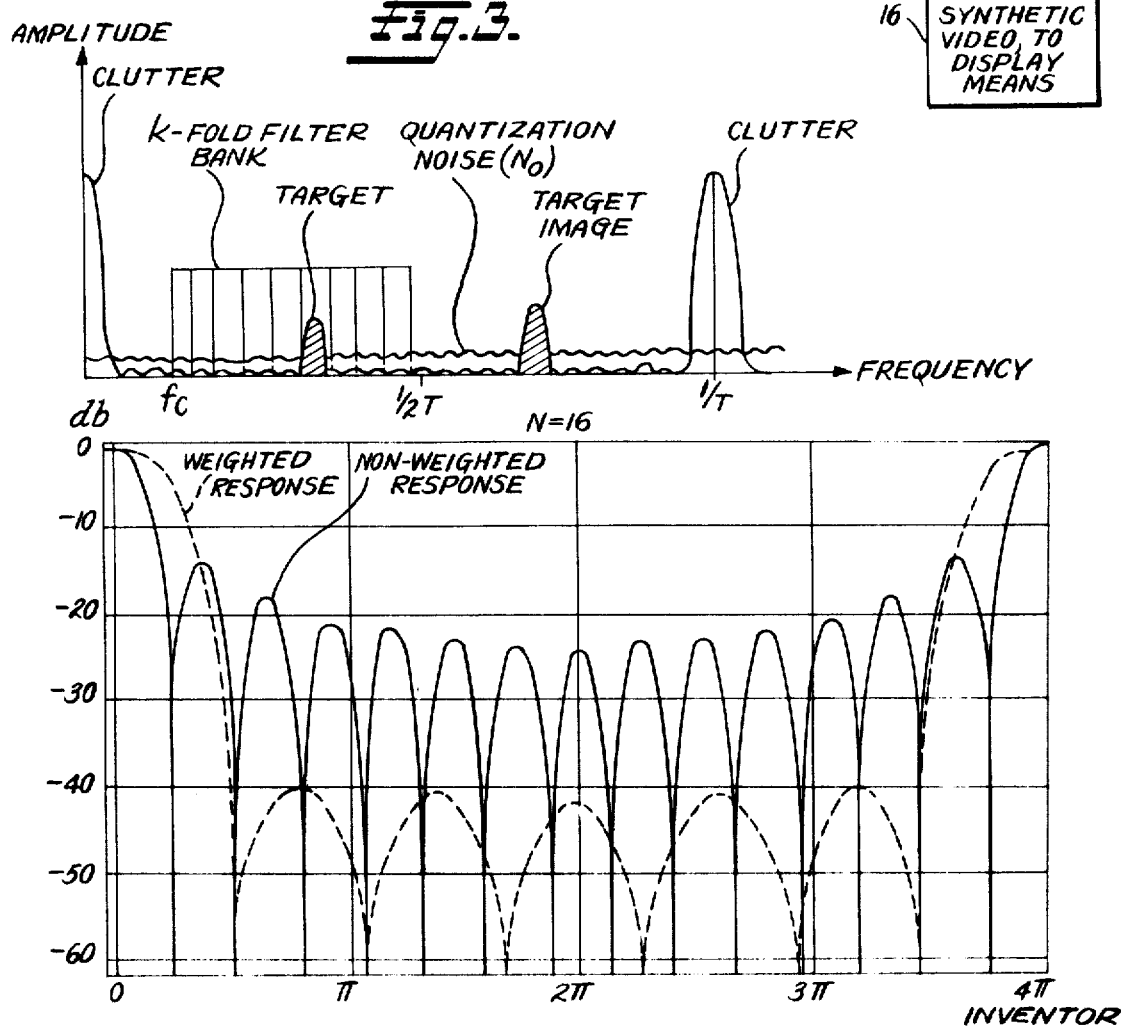
Fig. 3.
Fig. 4.

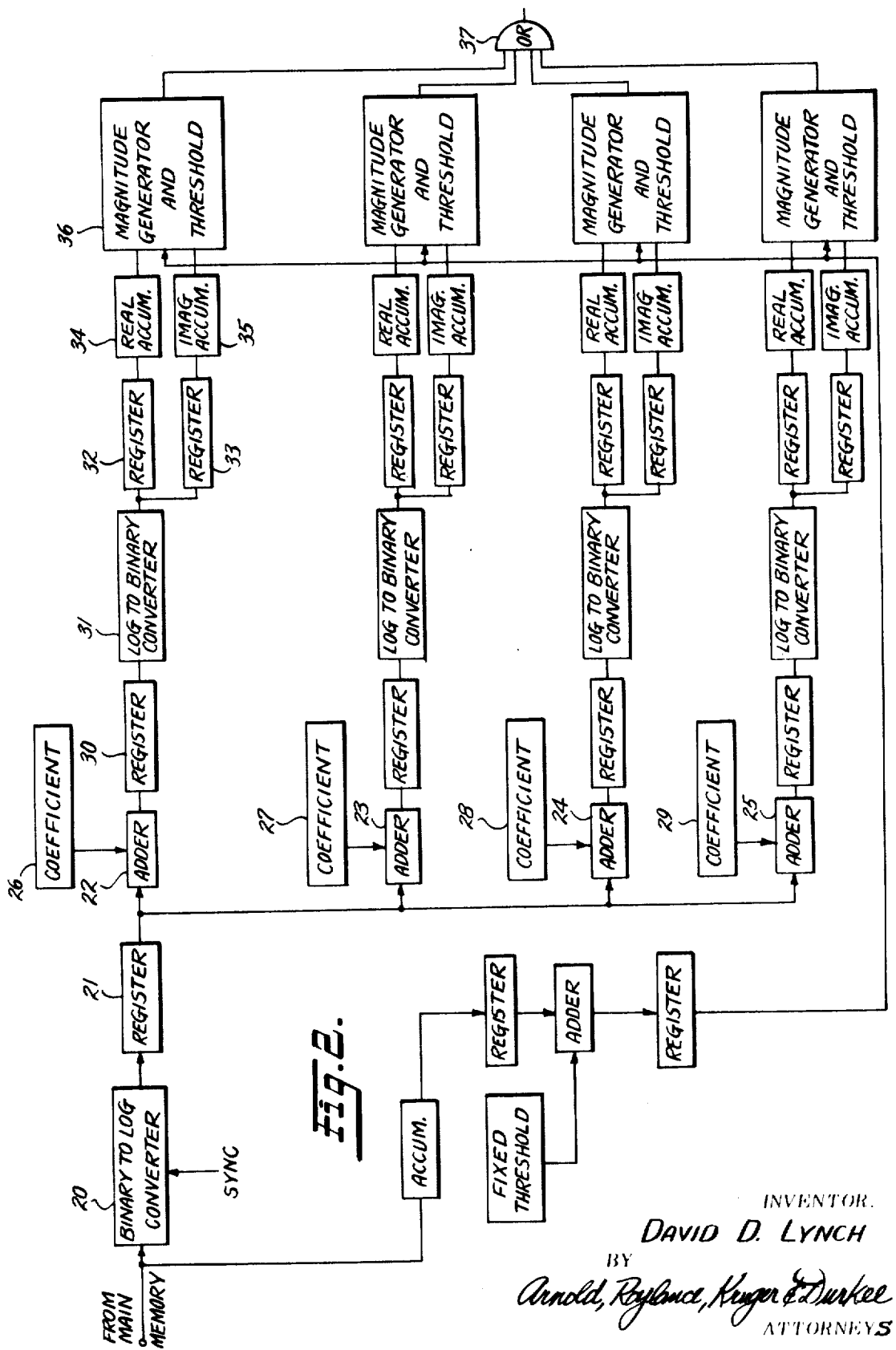

INVENTOR.
DAVID D. LYNCH
BY
Arnold, Roylance, Kruger & Durkee
ATTORNEYS

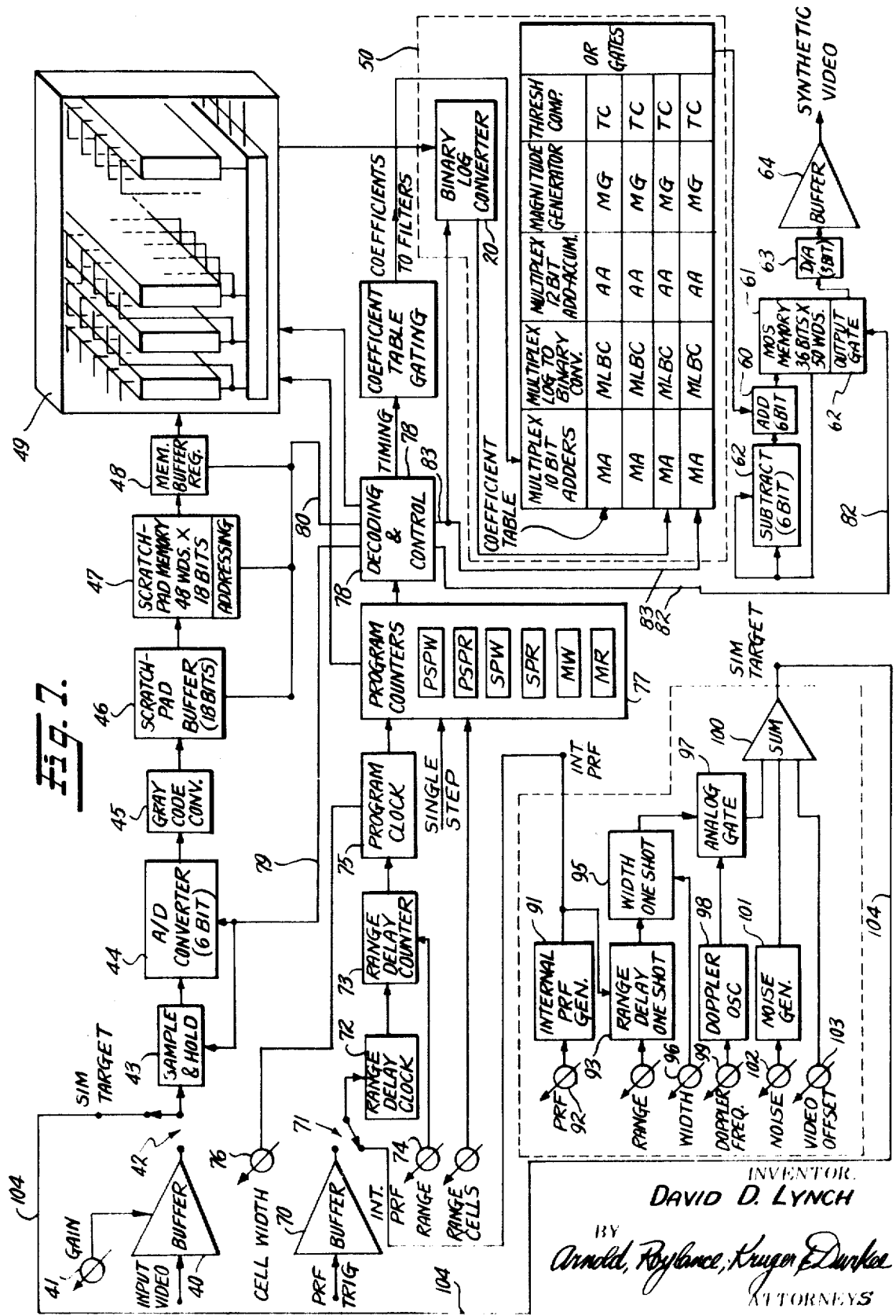

DIGITAL MODIFIED DISCRETE FOURIER TRANSFORM DOPPLER RADAR PROCESSOR

This invention relates to data processing method and apparatus, and more specifically to a method and apparatus for analyzing the data received in a radar system and for providing the information contained in that data in a usable form for display.

In the process of analyzing the information received in the form of radar returns, it is desirable to provide a system which provides high resolution, high reliability and stability, rapid response, rejection of clutter over a broad frequency range, programmability, and built-in tests. In a system which is designed to detect moving targets and to alert the operator of the existence of a moving target, it is also desired that the false alarm rate be controllable and minimal.

Disclosed herein is a system which utilizes time compression techniques with digital filters and which meets the criteria described above.

An object of the present invention is to provide a data processing system for a digital moving target indicator.

Another object is to provide a data processing system in which Doppler returns are received, converted to a convenient digital form, digitally filtered and reconverted for video display.

Another object is to provide a method of analyzing analog information contained in a radar return including the steps of sampling the analog information, digitizing the information and storing it on a return-by-return basis and periodically extracting the information from the store on a range-by-range basis for filtering and subsequent display.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a simplified block diagram of one embodiment of an apparatus in accordance with the invention;

FIG. 2 is a more detailed block diagram of a digital filter apparatus usable in the apparatus of FIG. 1;

FIG. 3 is a graph of the spectral relationship of target and clutter;

FIGS. 4–6 are graphs showing typical filter response curves;

FIG. 7 is a more detailed block diagram of an apparatus in accordance with the invention;

FIGS. 9 and 10 are logic diagrams for binary to log and log to binary converters usable in the apparatus of FIG. 2.

Figure 5:
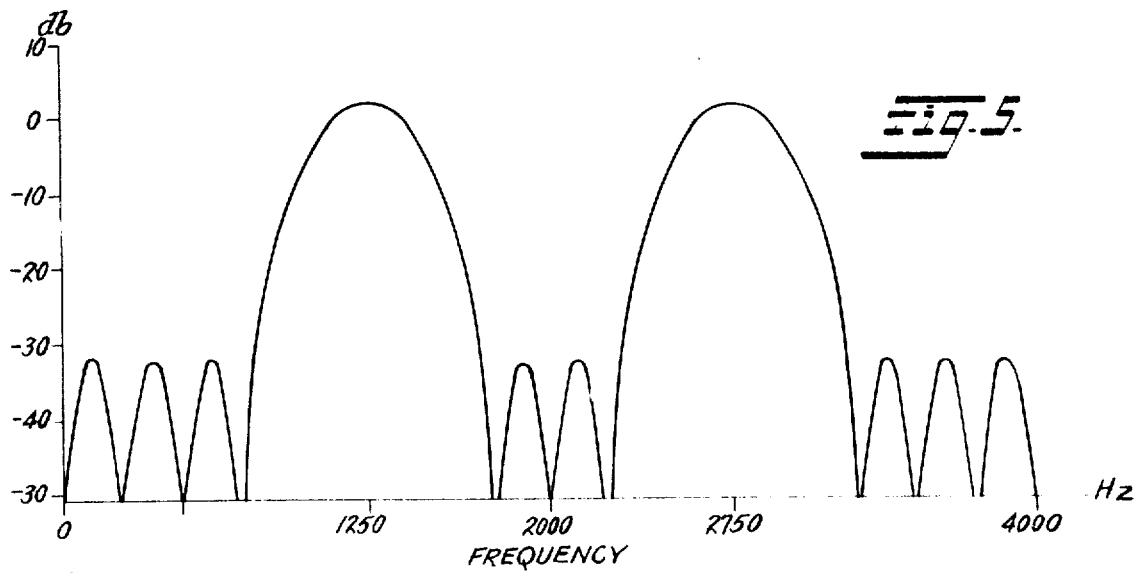

Broadly described, the invention includes means for sampling and digitizing the incoming analog returns and for converting the digitized information into a convenient digital code. The information is then placed in a temporary memory, termed a "scratchpad" memory, for which it is extracted and inserted in a main memory on a word serial or return-by-return basis. After the accumulation of sufficient information to give the necessary data on a target, the information is read out of the memory on a range-by-range basis and forwarded to a digital filter. The information is converted from binary linear to binary logarithmic form and processed in accordance with predetermined criteria in the filter. The information is then reconverted to analog form and buffered to suitable display equipment, the output being synthetic video representative of target motion information.

Referring now to the figures, it will be seen that FIG. 1 shows the basic elements of the system wherein the input information in analog form is supplied to an input terminal 10 from which it is conducted to an analog to digital converter 11 for conversion into digital form in a convenient code such as a Gray or reflected binary code. It can thereafter be converted into binary code for later processing. After conversion, the data is supplied to a memory 12 which, in broad terms, accomplishes the function of accumulating data as it is received and then supplying it in a compressed time, or nonreal time, form to a digital filter bank.

It will be recognized that a primary function of this system is to determine from the incoming data when a moving target exists within the field of view of the radar apparatus. This requires that the target be illuminated at successive times with the transmitted radar energy, that the radar receive returns from the target at other successive times, and that changing positional information derived from the returns be analyzed to determine whether or not a moving target exists. In any given return, information is received from reflecting objects at various ranges, the term "range" being used herein to signify distance from the radar equipment to a reflective object. When the information from each radar return is received, it is stored in the main memory on a return-by-return basis, the information in each return constituting data from several objects. The information is then extracted from the memory on a range-by-range basis, deviations in phase, or phase converted to amplitude, of any single target from one return to the next being indicative of motion of the target.

The information extracted from the main memory is then transferred to a digital filter bank 13. The digital filter bank includes modified discrete Fourier transform digital filters and uses binary logarithm multiplication for increased speed of operation. The filtering function is performed, broadly described, by multiplying the range information by a predetermined set of factors; this being accomplished in the filter by conversion of the binary data to binary logarithmic form, addition to a coefficient, and conversion of the sum from binary logarithm to binary form. This will be described in greater detail hereinafter.

The filtered information is then transferred to a postdetection memory 14 where the magnitude of the filtered data is compared with a threshold. If the filtered data exceeds the threshold, indicating a moving target, this information is stored integrated and thereafter transferred to a digital to analog converter 15 which puts the data in analog form for transmission to the display means 16.

The postdetection memory performs the functions of storing the processed range information for display buffering and provides postdetection integration.

At this point it will be helpful to consider in more detail the arrangement and operation of the digital filter. A preferred embodiment of this filter is shown in FIG. 2 wherein the input signal from the main memory is delivered to a binary to logarithm converter 20 which performs the function of determining the logarithm to the base 2 of the input binary data. In the embodiment described herein, each input to the filter is a 6-bit sample of the video return for a specific range. For each range, there are 16 samples which are processed serially. Each input is converted to a 10-bit binary logarithm and presented to an adder in each of four identical parallel filters. The logarithm conversion procedure has a speed advantage of 3 to 2 and a hardware advantage of 2 to 1 over a conventional cobweb array multiplier. The result of the multiplication procedure, or of the addition of logarithms, is a complex number so that two real multiplications must be performed. This is accomplished by multiplexing the real and imaginary coefficients for each filter. The output of the binary to log converter is buffered through a register 21 and delivered to four adders 22, 23, 24 and 25. Each adder is associated with a coefficient generator, these being identified as 26, 27, 28, and 29 in FIG. 2. Each coefficient generator produces an output signal which constitutes a weighting coefficient which is added to the logarithmic signal to accomplish the necessary multiplication function for filtering. The output of adder 22 is buffered through a register 30 to a logarithm to binary converter 31 which reconverts the signal, modified by the coefficient, to linear binary form. The products of the filter channels are divided at the log to binary output into real and imaginary parts i.e., orthogonal vector components and are summed in two accumulators. After 16 samples have been processed, the accumulated sums are converted from parallel to serial data flow, and the magnitudes of each of the two components is computed. The resulting magnitude is then compared to a programmable threshold value. A threshold crossing in any filter is considered a target detection. The output of converter 31 is buffered through two registers 32 and 33 to the real and imaginary accumulators 34 and 35 the outputs of which are compared with a threshold signal in a magnitude generator and threshold circuit 36.

Each of the remaining filters includes elements not shown which are identical to those shown for the first filter, the outputs of the threshold circuits of all filters being presented to an OR circuit 37 which provides the resulting target indication signal to the subsequent circuitry.

Because of the multiplexing, only one logarithm adder and logarithm to binary converter is required for each filter. In addition, the filter unit includes means for establishing the threshold values using the range signals as extracted from the main memory. The range data is connected to an accumulator 110 and register 111 which perform an integration of the "raw" range data and provide it to one input of an adder 112. A fixed threshold signal generator 113 provides a fixed threshold signal to the other input of adder 112. The added signals are buffered through a register 114 to the threshold units in the filter channels for comparison with the accumulated signals from the real and imaginary accumulators.

If the "raw" range data from the main memory includes a large amount of noise and clutter, the signals appearing at the output of register 114 will be relatively high, thereby establishing a high threshold and preventing false alarms due to the appearance of clutter as a target. Similarly, low clutter levels produce a low threshold. However, there is a level below which the threshold cannot be safely set. Thus, the fixed level is inserted to provide a threshold "floor" for operating circumstances in which clutter approaches zero.

The use of digital filters to provide the selectivity required to discriminate Doppler target frequencies from noise or clutter components is a significant feature of the invention. An example of the target and clutter spectral situation for a specific range is shown in FIG. 3. Also shown therein is the relationship of the digital filter bank which passes a band bracketing the target region. It will be observed that the clutter and spurious target images are rejected. Digital filters have several advantages over analog filters, including a greater degree of accuracy, and absolute stability of a given frequency characteristic in that the gain and dimensions of the pass band can be maintained. Also, the frequency characteristics of a digital filter can be easily programmed and a greater variety of filters can be built since problems such as negative impedance elements do not arise. Further, the output of a digital filter can be either a time or a frequency function.

When a time signal is sampled at a rate $f_s$, the signal spectrum is shifted around multiples of $f_s$. If the signal is such that it will occur within a known band having a highest frequency F which is less than $f_s/2$, no aliasing errors occur. If the sampled signal is held at its sampled value for a portion of time, $\Delta t$, of the sampling interval, the sampled spectrum is multiplied by a (sin $x$)/$x$ type function. The Fourier transform of a sampled and held signal, found by the method of successive differentiation, is $$X_s(\omega) = \Delta t \epsilon^{\frac{-j\omega\Delta t}{2}} \left[ \frac{\sin \frac{\omega\Delta t}{2}}{\frac{\omega\Delta t}{2}} \right] \sum_{k=0}^{N-1} x_k \epsilon^{-j\omega k\Delta t} \quad (1)$$

where $N$ is the number of samples and $x_k$ are the samples signal values. $X_s(\omega)$ may be thought of as the product of a modulating signal, $$F(\omega\Delta t) = \epsilon^{\frac{-j\omega\Delta t}{2}} \left[ \frac{\sin \frac{\omega\Delta t}{2}}{\frac{\omega\Delta t}{2}} \right] \quad (2)$$

and a modulated signal, $$G(\omega, t) = \Delta t \sum_{k=0}^{N-1} x_k \epsilon^{-j\omega\Delta t k} \quad (3)$$

The modulating signal is independent of the sampled signal and is merely a byproduct of the sample and hold process. The modulated signal is the discrete Fourier transform (DFT) of $x(t)$, the time signal. For a sinusoidal input, i.e., $$x_k = \epsilon^{-j(\omega_s t_k + \varphi)} \quad (4)$$

where $t_k = \frac{k}{f_s}$. The magnitude of the DFT is given by Equation (5):

$$|S(\omega)|^2 = \left[ \frac{\sin \frac{\omega\Delta t}{2}}{\frac{\omega\Delta t}{2}} \right]^2 \left[ \frac{\sin (\omega + \omega_s)(N-1)\Delta t/2}{\sin (\omega + \omega_s)\Delta t/2} \right]^2 \quad (5)$$

The normalized magnitude of each point in the DFT with $N=16$ is shown by the solid line curve in FIG. 4. It can be seen that the DFT may be thought of as a bank of elemental band-pass filters. The Fourier transform of an infinite duration sinusoid may be thought of as a band-pass filter which passes a single frequency. Similarly, the DFT may be thought of as a band-pass filter which only passes signals near its center frequency. Note that both give a frequency function output. A disadvantage of the DFT is that high suppression outside of the pass bank is not attainable since the sidelobes are only about 13 db. down.

An alternate method of obtaining a desired bandwidth filter with medium complexity and time delay consists of adding a time weighting function to a DFT computation. This method will be called the modified discrete Fourier transform (MDFT). A typical weighted response is shown by the dashed line curve in FIG. 4.

The MDFT technique consists of multiplying the sampled signal by a weighting function. Since time domain multiplication corresponds to frequency domain convolution, the convolution of the signal spectrum with the proper weighting spectrum can reduce the sidelobes. The MDFT filter design consists of selecting the proper weighting coefficients. Several good weighting functions have been developed. For example, the Hamming weighting function.

$$W(t_i) = .54 - .46 \cos\left(\frac{2\pi i}{N}\right), \quad (6)$$

where $i = 0, 1, \ldots N - 1$ reduces the first sidelobe to 37 db. down. It is also possible to select a desired power spectrum, which can be expressed as a trigonometric series, and determine the weighting function therefrom. This procedure requires some tedious calculations, especially for large $N$.

Figure 6:
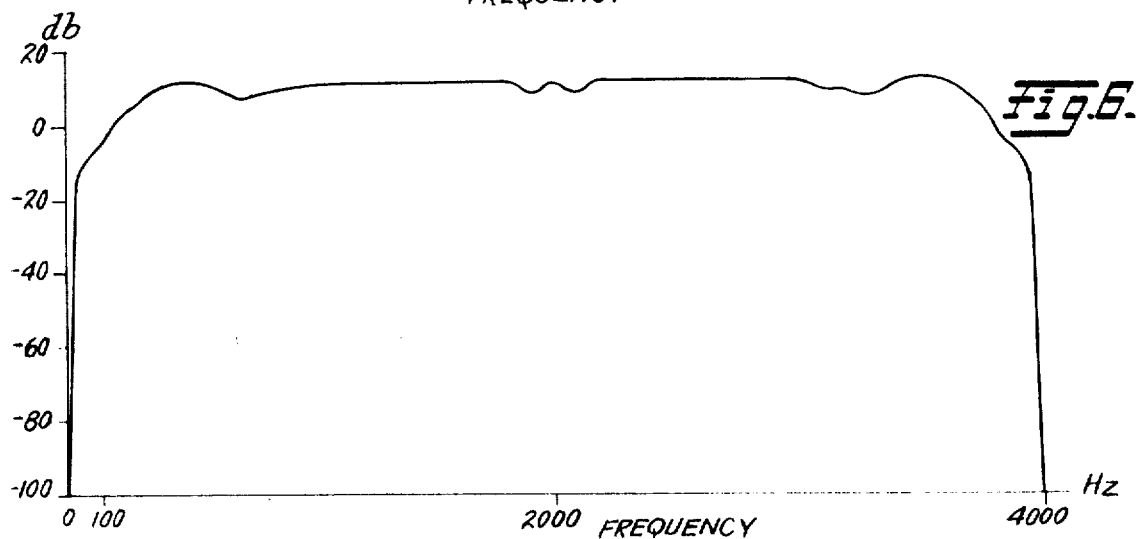

A typical filter response for $N=16$ samples and Hamming weighting is shown in FIG. 5. A typical composite response for a bank of 4 such filters is shown in FIG. 6. The filters are centered at 500, 750, 1,250 and 1,750 Hz. The pulse repetition frequency (PRF) is 4,000 Hz. Since the output of the four filters are OR'd together, the composite response is the maximum of the individual responses.

An additional technique for clutter rejection is frequency cancellation. The technique consists of computing the low frequency response, $H_0$, with one filter and subtracting this from the other filter responses. By proper selection of the weighting functions of the low-pass and band-pass filters, almost any desired cutoff frequency and ripple may be obtained.

In order to reduce hardware requirements, several algorithms are used in implementing the filter equation. Each filter computes $$Y(r) = \sum_{i=0}^{N-1} X_i C_{ir}, \quad (7)$$

where $$C_{ir} = \omega_{ir} \epsilon^{\frac{-j2\pi ir}{N}},$$

a complex coefficient; $r$ is the normalized frequency; $N$ is the number of samples; and $\omega_{ir}$ is a weighting coefficient.

Since $X_i C_{ir} = 2^{(\log_2 X_i + \log_2 C_{ir})}$ (8)
for $X_i \neq 0$ and $C_{ir} \neq 0$, multiplication can be reduced to an addition of the logarithms of $X_i$ and the coefficients. Also, since $\log_2 X_i$ is used by each filter, a single binary-to-binary logarithm converter is sufficient. The threshold operation consists of comparing the absolute value of $Y(r)$ with T where T is the threshold value.

For a more complete understanding of binary logarithm conversion, reference is made to the following publications:

J. N. Mitchell, Jr., "Computer Multiplication and Division Using Binary Logarithms," IEEE Transactions on Electronic Computers, Vol. EC—11, pp. 512-517, Aug. 1962;

M. Combet, H. Van Zonneveld, and L. Verbeek, "Computation of the Base Two Logarithm of Binary Numbers," IEEE Transactions on Electronic Computers, Vol. EC-14, No. 6, pp. 863-867, Dec. 1965.

A discussion of the discrete Fourier transform and techniques for its use can be found in G. D. Bergland, "A Guided Tour of the Fast Fourier Transform," IEEE Spectrum, July 1969, pp. 51-52, with an extensive bibliography.

A description of the algorithms used in the binary to logarithm and logarithm to binary conversions follows. A binary number N can easily be encoded into the form $$N = 2^K(1+x) \quad (9)$$

where $x$ lies between 0 and 1. The binary logarithm of $N$ is given by $$\log_2 N = K + \log_2(1+x) \quad (10)$$

A first order approximation of $\log_2 N$ is $K+X$. This is a piecewise linear approximation between the points where $\log_2 N$ takes on integral values. Greater accuracy can be obtained by further piecewise linear approximations of the range of $X$. With four correction ranges of $X$, the absolute error E, defined by $$E = \log_2(1+x) - (x + c(x)), \quad (11)$$

can be made less than 0.013. It has also been found by computer simulation that a mantissa length of seven bits was sufficiently accurate. An algorithm was developed for binary exponentiation of the logarithm sum. Letting $M = M_1 M_2$ be a binary number, then $$2^M = 2^{M_1 \cdot M_2} = 2^{M_1} 2^{\cdot M_2} \quad (12)$$

where $0 \leq \cdot M_2 < 1$.

A first approximation of $2^M$ is given by $$EXP(M) = 2^{M_1}(1 + .M_2) \quad (13)$$

This is a piecewise linear approximation to $2^M$ between the points where $M$ is an integer. Increased accuracy can be attained by further approximations over the range. An exponential correction is $$EXP\ \bar{C}(M) = 2^{M_1}(1 + M_2 + C(M_2)) \quad (14)$$

where $C(M_2)$ is a correction term. By computer simulation a function $C(M_2)$ was developed and easily implemented with an error smaller than 0.5 percent.

The binary to logarithm converter implemented here can be divided into four sections: the zero test and characteristic gates; the mantissa shift gates; the correction control circuit; and the correction adder. The converter is shown in block diagram form in FIG. 9. The zero test is used to clear the product register for a multiplication or to set the quotient register for division operations. The characteristic gates determine the location of the most significant bit (MSB=$2^K$) and produces the binary number $k$. These gates are described by logic equations given in table 1. The mantissa shift gates shift the bits at the right of the MSB into the proper position for correction addition. The mantissa gates are described by the logic equations in table 1. Since the correction regions are 0, ¼, ½, ¾, only the two MSB's are needed to control the correction addition. The correction adder adds the proper correction to the mantissa. The sum is then clocked into the mantissa register. A block diagram of the antilogarithm log to binary converter circuit for two correction regions and parallel arithmetic, using standard TTL logic elements is shown in FIG. 9. The input register contains both the characteristic and mantissa of the logarithm to be converted. A correction, depending on the MSB of the approximate mantissa, is added. The characteristic is then used to shift the number. This corresponds to multiplication by $2^k$. The logic equations are given in table 2.

Table 1. Characteristic gating logic equations.
$C_0 = A_5 + \bar{A_4} \cdot (A_3 + \bar{A_2} A_1)$
$C_1 = \bar{A_5} \cdot \bar{A_4} \cdot (A_2 + A_3)$
$C_2 = A_5 + A_4$
NOTE: Input = $A_5 A_4 A_3 A_2 A_1 A_0$
 Output = $C_2 C_1 C_0$
 + denotes logical addition, OR
 · denotes logical product, AND Table 2. Mantissa shift gate logic equations
$M_0 = 0$
$M_1 = A_0 \cdot A_5$
$M_2 = A_5 \cdot A_1 + \bar{A_5} \cdot A_4 \cdot A_0$
$M_3 = A_5 \cdot A_2 + \bar{A_5} \cdot A_4 \cdot A_1 + \bar{A_5} \cdot \bar{A_4} \cdot A_3 \cdot A_0$
$M_4 = A_5 \cdot A_3 + A_5 \cdot A_4 \cdot A_2 + \bar{A_5} \cdot \bar{A_4} \cdot (A_3 \cdot A_1 + \bar{A_3} \cdot A_2 \cdot A_0)$
$M_5 = A_5 \cdot A_4 + A_4 \cdot A_3 + \bar{A_5} \cdot A_3 \cdot A_2 + \bar{A_5} \cdot \bar{A_4} \cdot A_1 \cdot (A_2 + \bar{A_3} \cdot A_0)$
Input = $A_5 A_4 A_3 A_2 A_1 A_0$
Output = $M_5 M_4 M_3 M_2 M_1 M_0$ The sum of products for the real and imaginary components of $Y(r)$ are accumulated in the real and imaginary accumulators. After 16 input samples, the magnitude is generated using the algorithm:

If $Y = \sqrt{R^2 + I^2}$ let $Y_A = |R|$, if $R \geq 2I$
$|I|$, if $I \geq 2R$ (15)
$3/4(|R| + |I|)$, otherwise.

Although the error defined by $E = Y - Y_A$ can be as great as 10 percent, the effect of this error is reduced by the threshold operation.

It is also desirable to include in a system of this type a controlled false alarm response circuit which constitutes variable threshold operation. The threshold is generated by calculating the average clutter level in each range cell. The average level is then added to a fixed threshold value. The resultant threshold is then subtracted from each filter output scaled according to the filter full load output for clutter alone. This process is also described with reference to FIG. 2. The mean is readily available and is the sum of the signal amplitude values for the 16 input samples divided by 16. The multiplier increment which is selected by the operator allows the threshold increase generated by a threshold crossing to be scaled to allow control of false alarm rates.

FIG. 7 shows a more detailed block diagram of the entire system. The input video signal which contains the information in a target return is supplied to the input of a buffer amplifier 40, the gain of which is controllable by the operator by a conventional front panel adjustment 41. The output of the buffer amplifier is connected to a single-pole, double-throw switch indicated generally at 42 which can be switched to select either the output of the buffer amplifier or a simulated target input which is generated for testing purposes, the test signal generator to be discussed in greater detail hereinafter. The target signal is delivered from switch 42 to the input of a sample and hold circuit 43 which samples the input signal at a preselected rate and delivers the sampled and held signal to the input of an analog to digital converter 44. The analog to digital converter can be any conventional type but is advantageously of the type described in U.S. Pat. No. 3,187,325 issued to F. D. Waldhauer in which a Gray code is generated by a cascade arrangement of binary stages.

The output of converter 44 is a Gray code, if the A/D converter is that suggested above. For later processing, the code is converted to a binary code by a conventional Gray code converter 45, the output of which is connected through a buffer 46 to the input of a scratchpad memory 47. The scratchpad memory is used for packing several sample words into one main memory word as well as for reducing the data flow rate into the main memory. It will be recognized that the instantaneous data flow rate into the scratchpad memory is significantly higher than the average data flow rate over a long period of time (i.e., several sample cycles) and that, by slowing the data rate with the scratchpad, a main memory can be used which need only have an input capability at the slower rate. This reduces the speed and cost of the main memory. The information extracted from the scratchpad memory is buffered through a memory buffer register 48 to the main MOS memory in word serial form. The information is extracted orthogonally, range by range, from memory 49 and is connected to the digital filter 50 which was described above with reference to FIG. 2. In the filter the signal is converted to logarithm form, combined with the coefficients, converted back from logarithm to binary form, thresholded, and gated out of the filter to an adder 60. The output of the adder is connected to the input of a postdetection MOS memory 61 which provides feedback information to a subtracter 62, the output of the subtracter being the second input to adder 60. The data stored in the memory 61 is gated through an output gate 62 through a digital to analog converter 63 and then buffered through a buffer amplifier 64 to the utilization device in the form of a synthetic video signal.

To synchronize the various components of the system, the transmitted pulse is used as a synchronizing signal. The transmitted pulse is provided to a buffer amplifier 70, the output of which is connected to one fixed contact of a single-pole, double-throw switch indicated generally at 71. Switch 71 can be used to select either the buffer amplifier output or an internally generated synchronizing signal identified as internal PRF. The signal selected by switch 71 is connected to a range delay clock 72 which provides clock pulses to a range delay counter 73 having a variable range which can be selected from the front panel by a selector knob 74. The output of the counter is connected to a program clock 75 which is the main system clock. The rate at which the system recycles is selected in the program clock by the operator by setting a cell width adjustment 76 which selects the number of range words to be processed for a particular range. The program clock output is connected to the program counters which sequence the system through programs provided thereto in accordance with specific tracking criteria established for the system. The outputs of the program counter unit include trigger means for extracting information from the main memory 49. The program counter output also provides the synchronizing control input to the main decoding and control unit 78. Outputs from the control unit are provided on conductor 79 to synchronize the sampling and converting operations of units 43 and 44; synchronizing signals on conductor 80 for the scratchpad buffer, scratchpad memory addressing and main memory buffer register; synchronizing means for the main memory on conductor 81; gate enabling signals for output gate 62 on conductor 82; and synchronizing pulses on conductor 83 for the binary log converter and the multiplex adders in the digital filter.

The rising edge of a transmitted pulse from the radar transmitter, which is connected into buffer 70, enables the range delay countdown sequence by starting a flow of pulses from the range delay clock to the range delay counter 73. When the count or range set by the operator on the front panel is reached, the system clock is enabled. This commences the control operation which triggers the sampling and converting process in units 43 and 44. The input signal provided to buffer amplifier 40 and the sample and hold circuit is buffered to a bipolar signal, sampled and held and then quantized into 6 bits by converter 44. The video is sampled and quantized at the transmitted pulse width, in a preferred embodiment of the apparatus, for a count of 288. Since the analog to digital converter generates a Gray code, the range samples are converted to binary by the converter 45. Three range samples are placed into a single word in the scratchpad buffer register and then loaded into the scratchpad memory. The scratchpad can be read at one-half the rate at which it is written to compensate for the normally lower flow rate of the main memory, this extraction of information being controlled by the control signals to the memory buffer register.

As the scratchpad memory is read, the main memory is written. The main memory consists of 18–1600-bit MOS shift register planes with taps at 100-bit intervals to an output register. The memory capacity allows for 16 pulses of coherent doppler integration. To maintain the input flow rate, 18 range cells are processed during each interpulse interval, i.e., the number of range cells processed per PRF (transmitted pulse) is equal to the number of range samples per PRF divided by the number of pulses integrated, which is equal to 288 divided by 16, or 18 range cells. Since three range samples are placed in each memory word, the memory is read six times on each transmitted pulse (PRF) to obtain the required data. The processing interval is chosen such that 18 cells uniformly distributed throughout the range interval are processed together, i.e., the processed block on the first PRF consists of cells 1, 2, 3, 49, 50, 51,...241, 242, 243. On the next PRF, cells 4, 5, 6, 52, 53, 54, etc., are processed. The memory is read by extracting the data at the taps in the shift register plane and loading the information into the memory output register, i.e., the 16 range samples corresponding to a range R are removed simultaneously. The extracted data is then delivered to the digital filter.

The postdetection memory 61 serves two functions. The memory stores the processed range cells for display buffering and provides additional postdetection integration as required, up to the antenna dwell time. The memory is recirculated in synchronism with the input to provide a display sweep on each PRF. As the memory is turning over, the old range cells, corresponding to those just processed, are removed from memory, decayed, added to the newly processed cells, and placed back into memory. This is performed by subtraction circuit 62 which takes the processed information from memory 61, decays it against itself, and adds it in adder 60 to the newly injected data. The programmed decay approximately matches the total integration time to the antenna dwell time for best operation. The buffering provided by the postdetector frees the internal processing order for improved memory efficiency.

Figure 8:
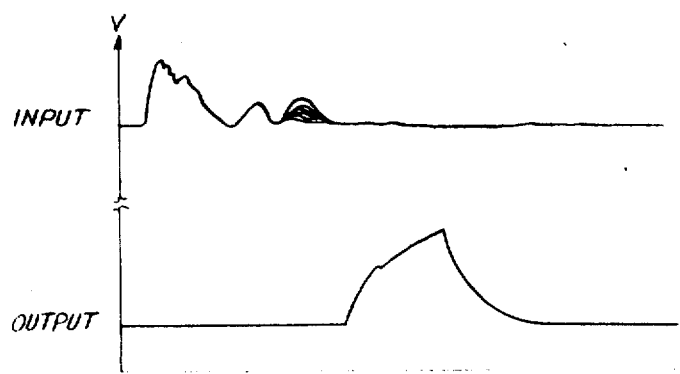
FIG. 8 is a waveform diagram showing typical input and output signals for the apparatus of FIG. 7.
Figure 8:
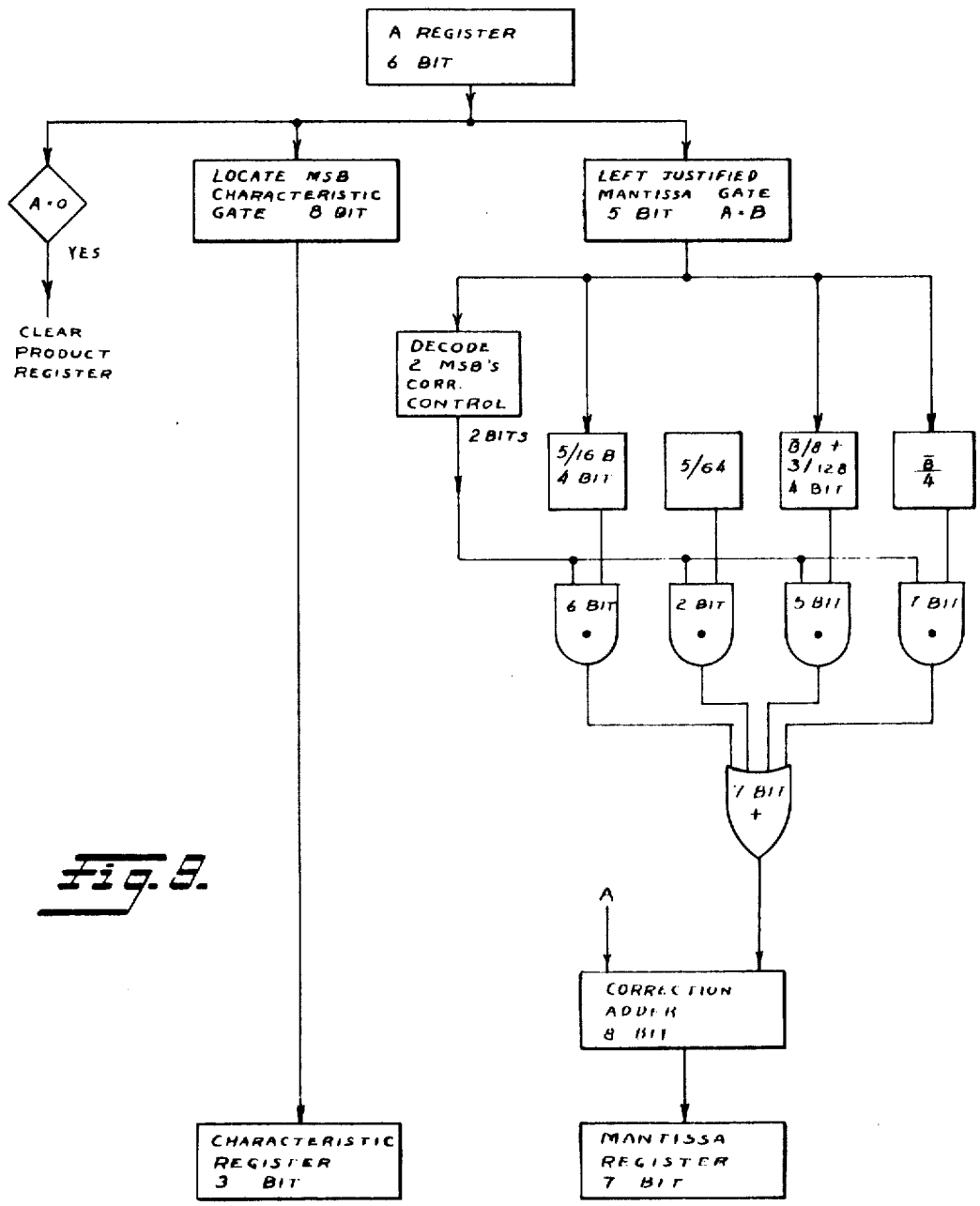
Figure 10:
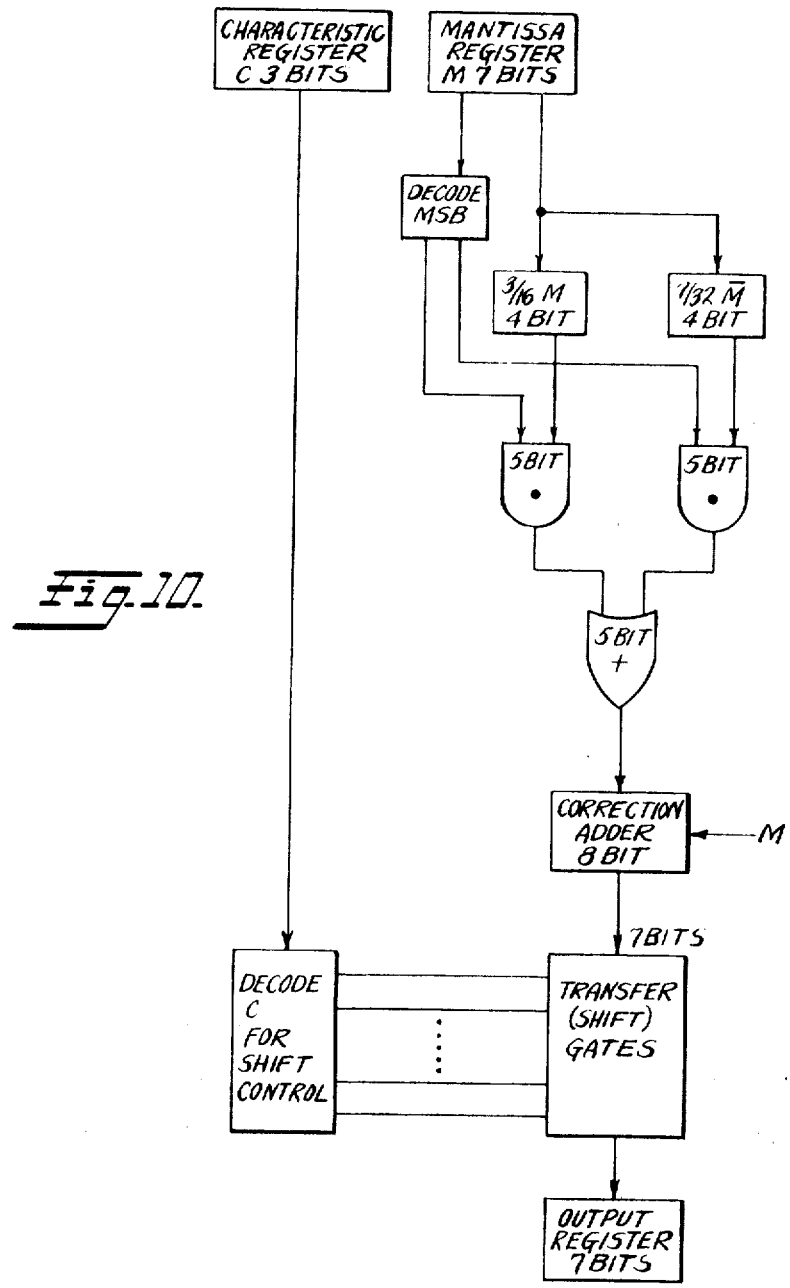

FIG. 8 shows typical input and output signals for the apparatus of FIG. 7. In FIG. 8 the waveform 120 is a typical input signal with a relatively large clutter portion near the beginning, returns from several fixed objects, and a target motion indication in the region indicated at 121. The doppler return appears on an oscilloscope as a rather fuzzy area occupied by waves of varying amplitude, representing phase changes in the doppler radar return as the target moves, changing the number of wavelengths (at the radar frequency) between the transmitter and the target. This is typical of the kind of signal supplied to buffer amplifier 40 in FIG. 7.

The lower waveform shows a typical output signal at the output of buffer 64 with a target indicated at 122.

For test purposes, a test signal generator 90 is provided and includes an internal PRF generator 91 which is designed to provide a pulse similar in nature and repetition rate to the transmitted pulse of the radar set. The PRF is variable and can be adjusted by a control 92 which is available to the system operator. The output of generator 91 is connected to a fixed contact of switch 71 and can be selected by the operator for test purposes. The PRF signal, labeled internal PRF, performs the function of starting the range delay clock and counter operations as previously described.

The output of generator 91 is also provided to a range delay one-shot circuit 93 which is part of a circuit designed to produce a simulated target return. Circuit 93 constitutes a variable delay monostable multivibrator, the time constant of which is adjustable by moving a range control knob 94 available to the operator. By adjusting knob 94 the operator can select the range at which the simulated target is to appear. The output of one-shot 93 is connected to a target width one-shot circuit 95 which is also a monostable multivibrator and which produces a pulse the width of which is adjustable to simulate targets having various physical dimensions. The width is adjustable by moving a width control 96, also available to the operator. The output of the width one-shot 95 is connected to the control terminal of a switchable path analog gate 97 to control the duration of time that the gate is rendered conductive. A Doppler oscillator 98 provides a signal to gate 97 which, when the gate is conductive, is delivered to one input of a summing amplifier 100. The frequency of Doppler oscillator 98 is controlled by adjustment of a Doppler frequency control 99. This modifies the degree of motion which will appear to exist in the simulated target. A noise generator 101 produces a noise signal, the magnitude of which is controllable by adjusting a control 102, which is provided to a second input of summing amplifier 100. A bias signal is provided to the amplifier by a video offset control 103. The target characteristics are summed by amplifier 100 and provided, via conductor 104, to a fixed contact of switch 42 at which a simulated target indication can be selected for processing through the sample and hold and the remaining circuitry of the system for test purposes.

Figure 11:
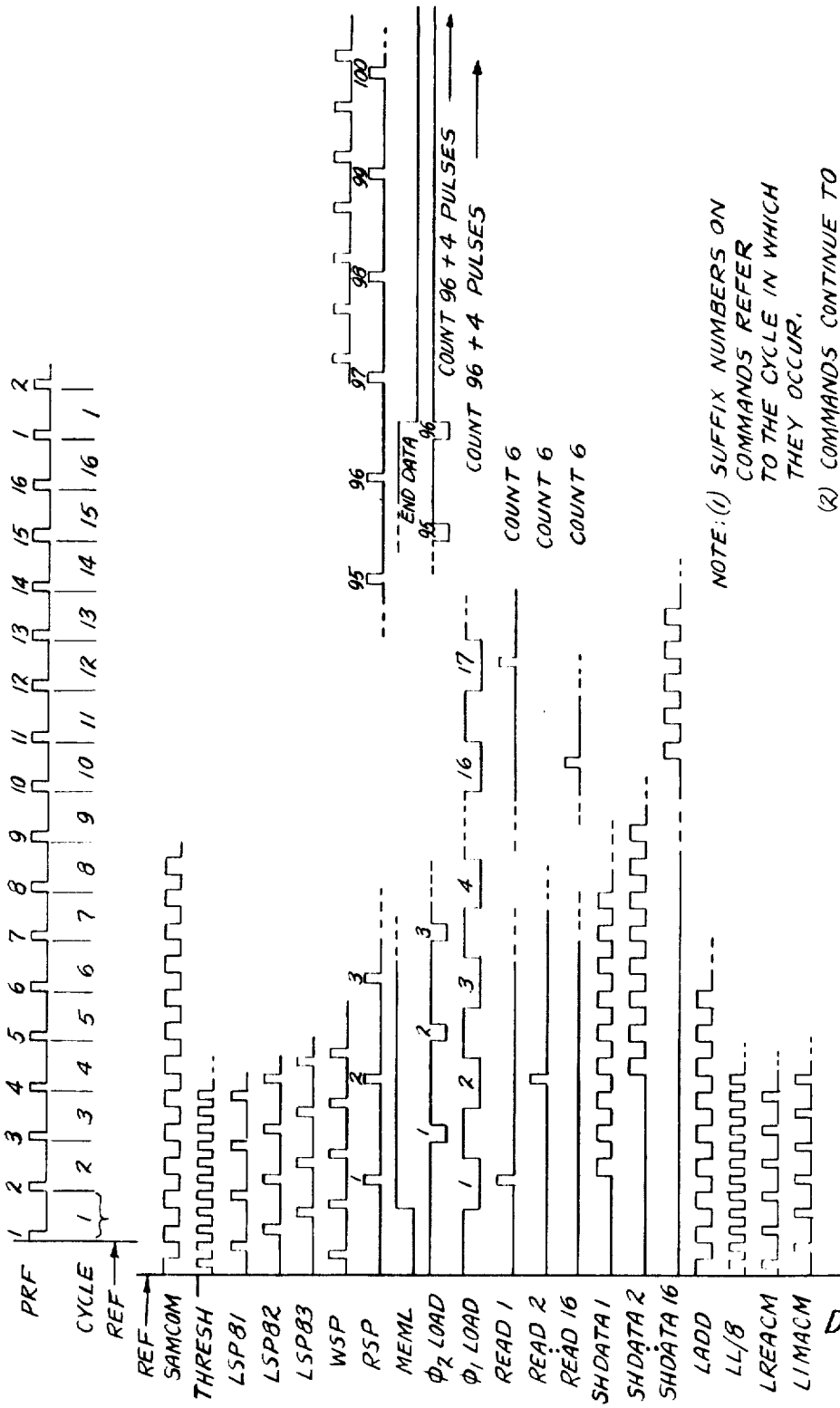
FIGS. 11–13 are waveform timing diagrams showing the timing pulses used to synchronize the various portions of the system of FIG. 7.
Figure 12:
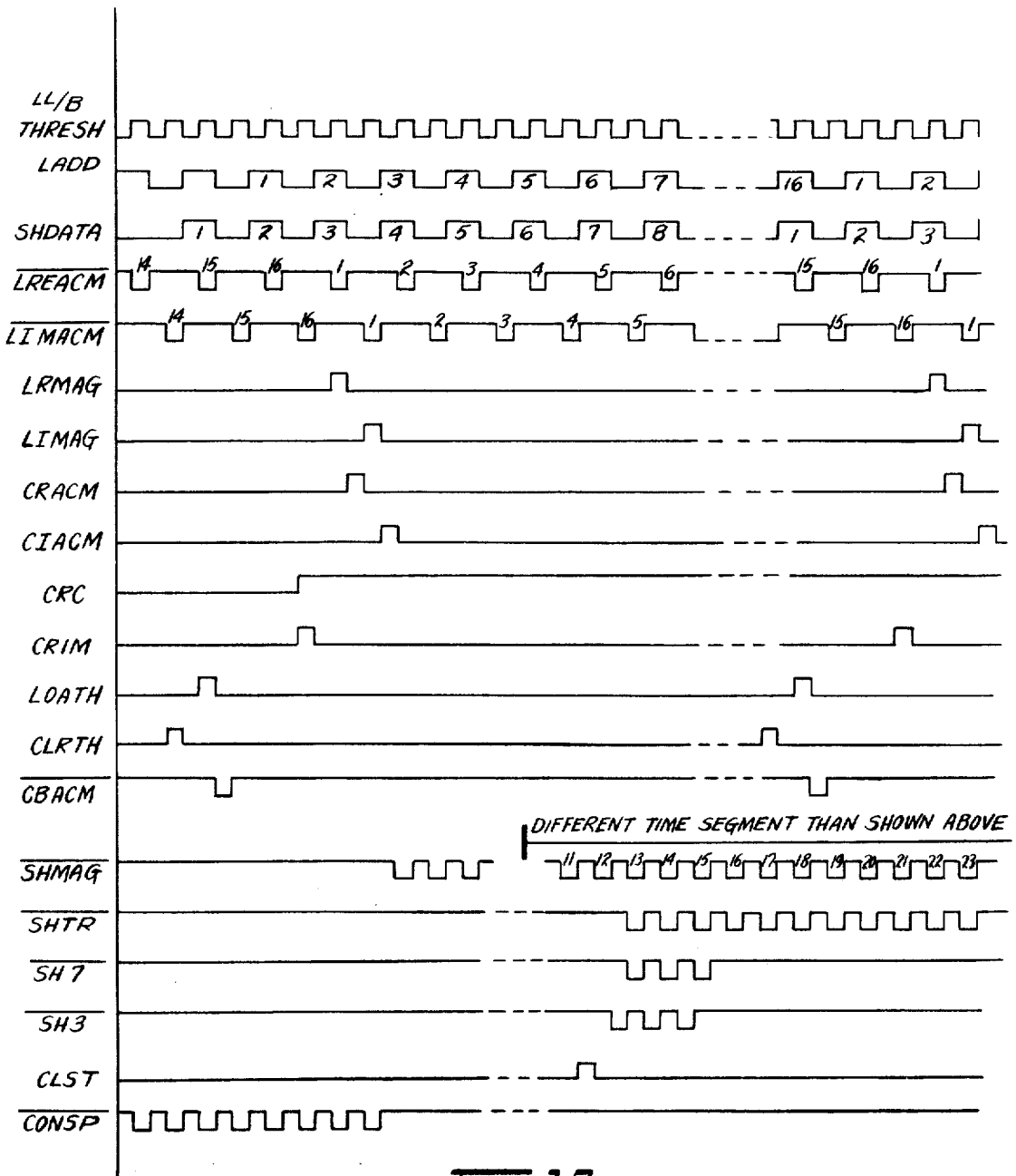
Figure 13:
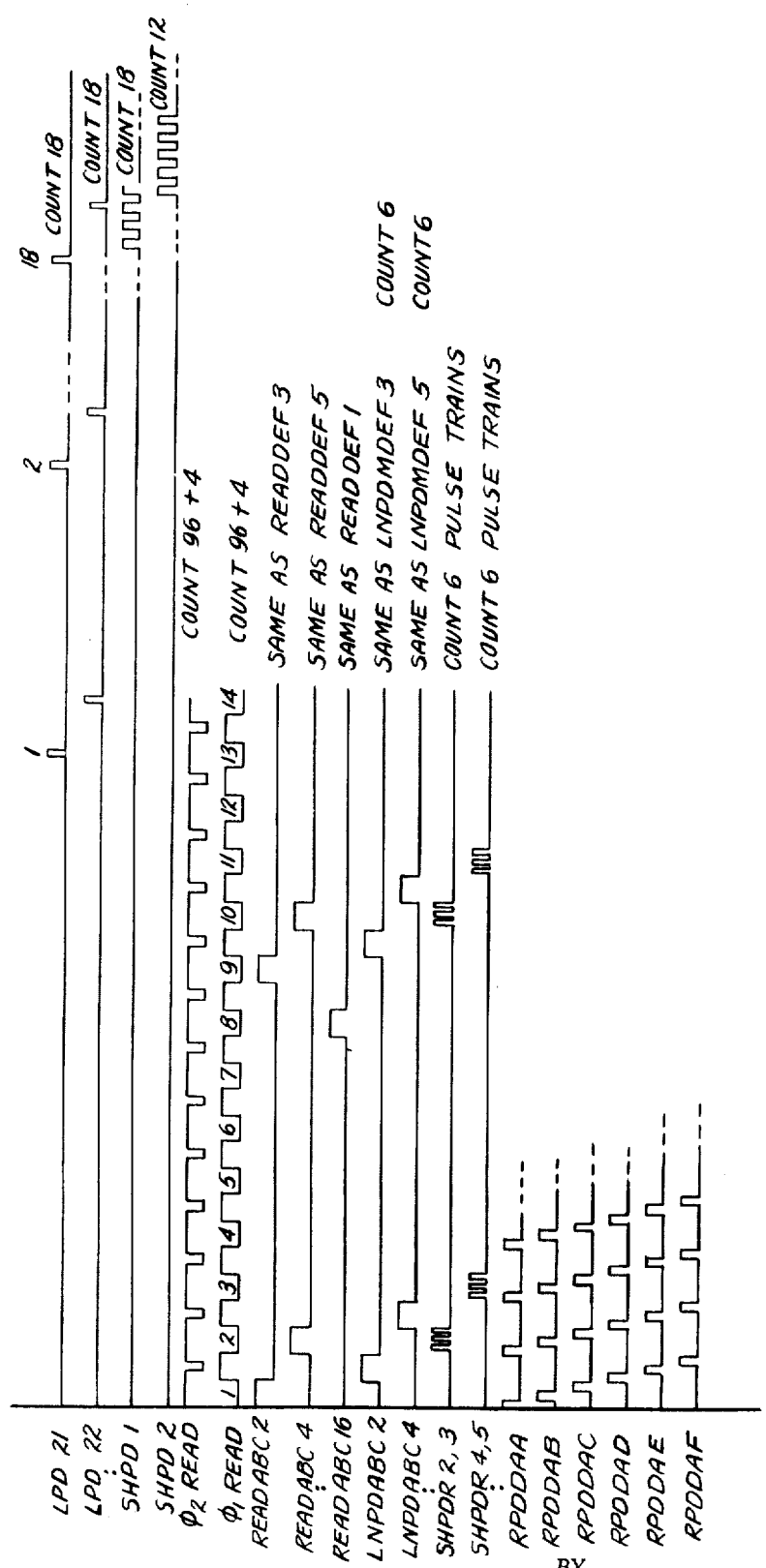

FIGS. 11, 12, and 13 show typical timing signals which can be used to synchronize and control the events throughout the system. The timing signal diagrams are believed to be self explanatory when read in conjunction with the following "translation" of the codes identifying the individual pulse trains:

| | |
|---|---|
| Samcom | sample command |
| Thresh | threshold |
| LSPB1 | load scratchpad memory, bank 1 |
| LSPB2 | load scratchpad memory, bank 2 |
| LSPB3 | load scratchpad memory, bank 3 |
| WSP | write, scratchpad memory |
| RSP | read, scratchpad memory |
| MEML | load main memory |
| $\Phi_1$ | load main memory $\Phi_1$ |
| $\Phi_2$ | load main memory $\Phi_2$ |
| Read 1 | read main memory PRF 1 |
| Read 2 | read main memory PRF 2 |
| Read 16 | read main memory PRF 16 |
| SH Data 1 | shift data in main memory output register, PRF 1 |
| SH Data 2 | shift data in main memory output register, PRF 2 |
| | shift data in main memory output register |
| SH Data 16 | shift data in main memory output register, PRF 16 |
| LADD | load adder |
| LL/B | load log to binary converter |
| LREACM | load real accumulator |
| LIMACM | load imaginary accumulator |
| LRMAG | load real magnitude gen. |
| LIMAG | load imaginary magnitude gen. |
| CRACM | clear real accumulator |
| CIACM | clear imaginary accumulator |
| CRC | clear ring counter |
| CRIM | clear real and imaginary registers in magnitude generator |

Table — Continued

| | |
|---|---|
| LOATH | load threshold registers |
| CLRTH | clear threshold registers |
| CBACM | clear binary accumulator |
| SHMAG | shift magnitude generator registers |
| SHTR | shift threshold registers |
| SH7 | shift register comparison for magnitudes greater than seven |
| SH3 | shift post threshold register three places |
| CLST | clear post threshold shift register |
| CONSP | clock old and new data into postdetection scratchpad |
| LPDR1 | load postdetection register, PRF 1 |
| LPDR2 | load postdetection register, PRF 2 |
| SHPD1 | shift postdetection register 1 |
| SHPD2 | shift postdetection register 2 |
| $\Phi_1$ READ | read postdetection memory $\Phi_1$ |
| $\Phi_2$ READ | read postdetection memory $\Phi_2$ |
| LNPD | load postdetection memory |
| RPDDAA-F | read postdetection data to D/A, cycles A-F |

While certain advantageous embodiments have been chosen to illustrate the invention, it will be understood by those skilled in the art that various changes and modifications can be made therein without departing from the scope of the invention as defined in the appended claims.

What is claimed is:

1. Apparatus for processing radar return data comprising the combination of
    memory means for storing the data from a plurality of returns in binary form in the order in which it is received;
    means for extracting the binary data from said memory means in sets according to radar range categories of said data;
    means for digitally filtering said sets of data according to frequency characteristics of said sets of data, including means for generating a threshold level signal and means for comparing filtered data with said threshold level signal; and
    means for converting said filtered data to analog form for display.

2. Apparatus for processing pulsed radar return information signals in analog form comprising the combination of
    means for converting the analog signals to digital form,
    means for storing the digital signals from a plurality of returns on a return-by-return basis;
    means for reading, on a range-by-range basis, the stored signals from a plurality of ranges, representing a small fraction of the total number of ranges, during each pulse return period;
    means for digitally filtering said read signals and for rejecting all signals except those in a predetermined band of frequencies;
    memory means for storing the filtered information signals; and
    means for extracting the stored signals and converting them to analog form.

3. A digital filter comprising the combination of
    means for accepting linear binary data signals and for converting said data signals to signals in binary logarithmic form;
    means for generating electrical signals representing a coefficient function;
    means for adding said coefficient function signals to said binary logarithmic data signals;
    means for converting the sum of said coefficient function signals and said binary logarithmic signals to signals in linear binary form;
    means for generating a signal representative of threshold; and
    means for comparing said sum signal with said threshold signal and for providing, as a filter output signal, only those elements of said sum signal which exceed said threshold.

4. A digital filter comprising the combination of means for accepting linear binary data signals and for converting said data signals to signals in binary logarithmic form;

means for connecting said binary logarithmic signals to a plurality of filter channels, each channel comprising means for generating electrical signals representing a coefficient function, means for adding said coefficient function signals to said binary logarithmic data signals, means for converting the sum of said coefficient function signals and said binary logarithmic signals to signals in linear binary form, means for generating a signal representative of a threshold level calculated from the binary data signals, and means for comparing said sum, in linear binary form, with said threshold signal and for providing, as the output of said channel, only those components of said sum signal which exceed said threshold; and OR circuit means connected to the outputs of all of said channels.

5. A method of processing binary signals containing information from successive Doppler radar returns comprising the steps of storing the signals in a memory unit on a return-by-return basis, categorized by range;

sequentially reading the signals from the memory, range-by-range;

taking the logarithm to the base 2 of the sequentially read information signals;

generating a plurality of logarithmic weighting coefficient signals;

separately adding each weighting coefficient to the logarithms of the sequentially read information signals;

comparing the sums obtained in the adding step to preselected threshold levels; and providing the portions of the sums in excess of the threshold signals as display information.

6. A method of processing analog signals containing information from Doppler radar returns comprising the steps of sampling the analog signals and converting the sampled portions to linear binary form;

storing the linear binary signals in a memory device on a return-by-return basis, categorized by range;

sequentially reading the signals from the memory, range-by-range;

taking the logarithm to the base 2 of the sequentially read information signals;

generating a plurality of logarithmic weighting coefficient signals;

separately adding each weighting coefficient to the logarithms of the sequentially read information signals;

comparing the sums obtained in the adding step to preselected threshold levels; and converting all portions of the sums thus obtained in excess of the threshold signals to analog form for subsequent display.

7. Apparatus for processing radar return data comprising the combination of memory means for storing the data in binary form in the order in which it is received;

means for extracting the data from said memory means in sets according to radar range categories of said data;

means for digitally filtering said data comprising a. means for generating a plurality of time weighting digital coefficient signals;

b. means for multiplying said sets of data by said digital time weighting coefficient signals; and c. means for comparing the resulting signals with a predetermined threshold level signal; and means for converting said data to analog form for display.

8. Apparatus according to claim 7 wherein said means for digitally filtering said data comprises means for separately summing orthogonal vector components of the product of sets of data and digital time weighting coefficient signals.

9. Apparatus according to claim 7 wherein said means for digitally filtering said data comprises a plurality of digital filters connected to an output by an OR gating means, each of said filters being adapted to pass data at a different frequency.

10. Apparatus according to claim 7 including means for generating said threshold level signal comprising means for generating a fixed signal; means for generating a second signal having a level dependent on said unfiltered data, and means for combining said fixed level signal and said second signal.

11. Apparatus for processing radar return data comprising the combination of memory means for storing the data in binary form in the order in which it is received;

means for extracting the data from said memory means in sets according to radar range categories of said data;

means for digitally filtering said data, comprising a. means for converting the data extracted from said memory means to binary logarithmic form;

b. means for generating a plurality of logarithmic weighting coefficient signals;

c. means for adding said logarithmic weighting coefficient signals to said binary logarithmic data;

d. means for converting the adder output signals to linear binary form; and e. means for comparing the converted adder output signals to a predetermined threshold level signal; and means for converting said data analog form for display.